US012146352B2

(12) United States Patent
Wilke et al.

(10) Patent No.: US 12,146,352 B2
(45) Date of Patent: Nov. 19, 2024

(54) INTERIOR DOOR HANDLE ARRANGEMENT OF A VEHICLE, AND METHOD FOR PRODUCING AN INTERIOR DOOR HANDLE ARRANGEMENT

(71) Applicant: ILLINOIS TOOL WORKS INC., Glenview, IL (US)

(72) Inventors: Zsolt Wilke, Bad Mergentheim (DE); Elmar Fries, Buchenweg (DE); Anna Lisa Contini, Würzburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1289 days.

(21) Appl. No.: 16/378,750

(22) Filed: Apr. 9, 2019

(65) Prior Publication Data
US 2019/0316390 A1    Oct. 17, 2019

(30) Foreign Application Priority Data

Apr. 11, 2018    (DE) .......................... 102018108614.8

(51) Int. Cl.
*B29C 45/00*    (2006.01)
*B29C 45/02*    (2006.01)
(Continued)

(52) U.S. Cl.
CPC .......... *E05B 85/12* (2013.01); *B29C 45/0001* (2013.01); *B29C 45/02* (2013.01); *E05B 85/16* (2013.01); *B29K 2505/00* (2013.01); *B29K 2995/0008* (2013.01); *B29L 2031/463* (2013.01); *B60R 2011/0021* (2013.01); 
(Continued)

(58) Field of Classification Search
CPC ...... E05B 85/12; E05B 85/16; E05B 17/0004; B29C 45/0001; B29C 45/02; B29C 33/16; B29C 45/16; B29C 45/1675; B29C 45/1676; B29C 45/1679; B29C 45/14; B29K 2505/00; B29K 2995/0008; B29K 2995/0012; B29L 2031/463; B29L 2031/3029; B60R 11/0217; B60R 2011/0021; B60R 2011/0045; E05Y 2900/531

See application file for complete search history.

(56) References Cited

U.S. PATENT DOCUMENTS 3,677,525 A     7/1972  Schurig
5,129,694 A *   7/1992  Tanimoto ............. E05B 1/0061
                                          292/DIG. 31
(Continued)

FOREIGN PATENT DOCUMENTS

CN          1354815 A      6/2002
CN        101002000 A      7/2007
(Continued)

*Primary Examiner* — Kristina R Fulton
*Assistant Examiner* — Thomas L Neubauer
(74) *Attorney, Agent, or Firm* — THOMPSON HINE LLP

(57) ABSTRACT

An interior door handle arrangement of a vehicle, includes a housing and an actuating section which is arranged on the housing, wherein the housing and/or the actuating section have/has a carrier section made from a first plastic and a visible section made from another, second material which is connected to the carrier section in an integrally joined manner. A method for producing such an interior door handle arrangement is also provided.

13 Claims, 2 Drawing Sheets

(51) Int. Cl.
  *E05B 85/12* (2014.01)
  *E05B 85/16* (2014.01)
  *B29K 505/00* (2006.01)
  *B29L 31/46* (2006.01)
  *B60R 11/00* (2006.01)
  *B60R 11/02* (2006.01)

(52) U.S. Cl.
  CPC ... *B60R 2011/0045* (2013.01); *B60R 11/0217* (2013.01); *E05Y 2900/531* (2013.01)

(56) References Cited

U.S. PATENT DOCUMENTS

| | | | |
|---|---|---|---|
| 6,528,158 B1 | 3/2003 | Kuroda | |
| 6,626,473 B1 | 9/2003 | Klein | |
| 6,929,294 B2* | 8/2005 | Byrla | E05B 17/10 |
| | | | 292/336.3 |
| 7,520,543 B2* | 4/2009 | Purdy | E05B 17/0004 |
| | | | 292/DIG. 31 |
| 8,113,695 B2* | 2/2012 | Meinke | B60R 13/005 |
| | | | 362/351 |
| 9,694,739 B2* | 7/2017 | Salter | B60Q 3/10 |
| 9,945,162 B2 | 4/2018 | Schurig | |
| 9,945,163 B2 | 4/2018 | Schurig | |
| 2004/0022988 A1 | 2/2004 | Park | |
| 2007/0048470 A1* | 3/2007 | Zadesky | B29C 45/162 |
| | | | 425/572 |
| 2008/0018127 A1 | 1/2008 | Schindler | |
| 2010/0171324 A1 | 7/2010 | Stapf | |
| 2012/0097194 A1* | 4/2012 | McDaniel | A01N 63/50 |
| | | | 435/197 |
| 2012/0213884 A1 | 8/2012 | Judd | |
| 2013/0240528 A1 | 9/2013 | De Beer | |
| 2016/0348410 A1 | 12/2016 | Schurig | |
| 2018/0056560 A1 | 3/2018 | Seo | |
| 2019/0316390 A1 | 10/2019 | Wilke | |

FOREIGN PATENT DOCUMENTS

| | | |
|---|---|---|
| CN | 107743538 A | 2/2018 |
| CN | 209509794 U | 10/2019 |
| DE | 19856902 A1 | 6/2000 |
| DE | 102005022791 A1 | 11/2006 |
| JP | H1035289 | 2/1998 |
| JP | H10131550 A | 5/1998 |
| KR | 20180107427 | 10/2018 |
| WO | WO 2007134985 A2 | 11/2007 |
| WO | WO 2010066419 | 6/2010 |

* cited by examiner

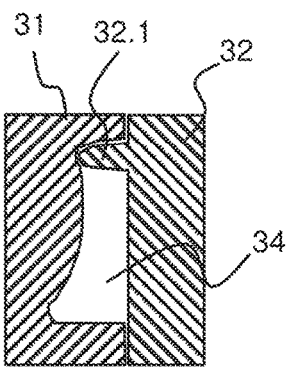
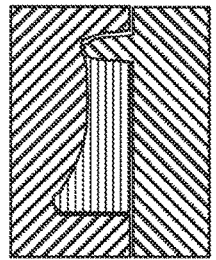
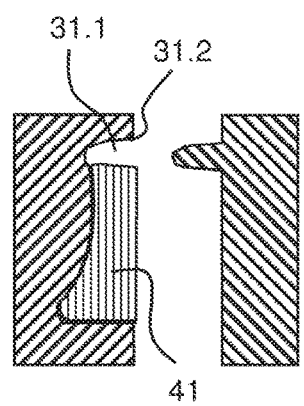
Fig. 4A  Fig. 4B  Fig. 4C
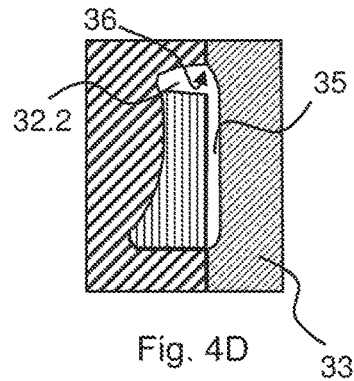
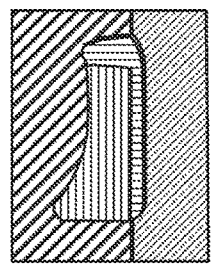
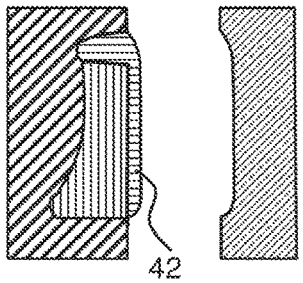
Fig. 4D  Fig. 4E  Fig. 4F
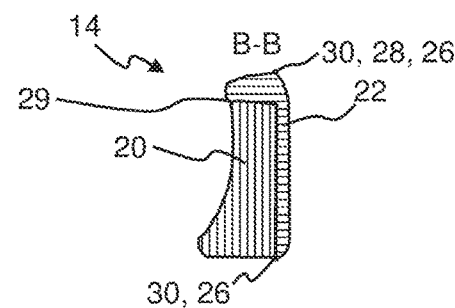
Fig. 4G
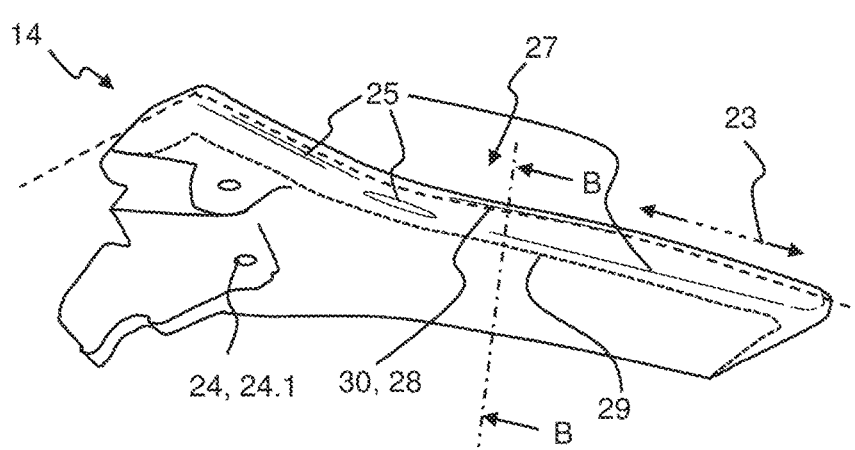
Fig. 5

INTERIOR DOOR HANDLE ARRANGEMENT OF A VEHICLE, AND METHOD FOR PRODUCING AN INTERIOR DOOR HANDLE ARRANGEMENT

TECHNICAL FIELD

The invention relates to an interior door handle arrangement of a vehicle, comprising a housing and a fastening section which is arranged on the housing, and a method for producing an interior door handle arrangement.

BACKGROUND

The actuating section of a door handle arrangement can be, for example, a handle section. It can be, for example, a handle lever which is mounted pivotably on the housing. The actuating section can be configured to be gripped by a vehicle occupant, in order to open and/or to close a vehicle door from the inside. The housing and the actuating section frequently consist of plastic. For visual reasons, there is sometimes the desire for a metal appearance of the actuating section. To this end, chrome plating of the handle lever takes place in the prior art. In this way, high quality surfaces can be produced, whereas at the same time the main body of the actuating section which is provided with the chrome layer can be produced from a resilient plastic. Chrome plating, in particular with the use of chromium VI, is problematic, however, for health and environmental protection reasons.

One alternative to chrome plating is the production of the actuating section in an injection molding method with a plastic with a metallic look (Mold In Metal Color MIMC). In this way, a look which is similar to chrome plating can be achieved. Surface defects, such as flow lines or recesses, in particular on account of material shrinkage, are problematic, however. In addition, the plastics which are used for this purpose are not always sufficiently resilient and, in particular, do not always have the required maximum breaking load. This also applies to the housing.

SUMMARY

Proceeding from the described prior art, the invention is based on the object of providing an interior door handle arrangement and a method of the type mentioned at the outset, which make high quality surfaces of the housing and/or the actuating section possible with great design freedom and, at the same time, satisfactory resilience.

The invention achieves the object preferably by way of the independent claims. Advantageous refinements are found in the dependent claims, the description and the figures.

Generally, the invention achieves the object for an interior door handle arrangement of the type mentioned at the outset by virtue of the fact that the housing and/or the actuating section have/has a carrier section made from a first plastic and a decoration section, preferably visible section made from another, second material which is connected to the carrier section in an integrally joined manner.

More particularly, the invention achieves object by an interior door handle arrangement of a vehicle, comprising a housing and an actuating section which is movably arranged on the housing, wherein the actuating section has a carrier section made from a first plastic and a decoration section, preferably a visible section, made from a second, preferably another plastic which is connected to the carrier section in an integrally joined manner, whereby preferably the decoration section is or is intended to be at least partially directly visible from the vehicle interior compartment and facing the vehicle interior compartment, wherein the actuating section has been produced using a two-component injection molding process.

As described at the outset, the interior door handle arrangement serves to open and/or close a vehicle door from the vehicle interior compartment. To this end, the interior door handle arrangement is mounted in the interior compartment of a vehicle, such as a passenger car or truck. Accordingly, the invention also relates to a vehicle having an interior door handle arrangement which is mounted therein. The interior door handle arrangement comprises a housing, by way of which it is fastened to a vehicle door. An actuating section is arranged on the housing, which actuating section can be actuated manually, for example gripped, by a vehicle occupant. The actuating section can be mounted on the housing movably, for example pivotably or translationally movably. It can be, for example, a handle lever which is mounted pivotably on the housing. The actuating section can also be, for example, a button or the like which is actuated by a vehicle occupant, however. The actuating section can be configured to be actuated by a vehicle occupant, in order to open and/or to close a vehicle door from the inside.

According to the invention, the housing and/or the actuating section comprise/comprises a carrier section made from a first plastic and a decoration section, preferably visible section which is connected to the carrier section in an integrally joined manner and preferably consists of a different material than the carrier section. The carrier section carries the decoration section, preferably visible section. The decoration section, preferably visible section is directly visible from the vehicle interior compartment and as a rule faces the vehicle interior compartment. It forms what is known as an A-surface, of which particularly high requirements are made in visual terms. The carrier section forms what is known as a B-surface and at least sections of it cannot be directly seen from the vehicle interior compartment. Said carrier section can be arranged, for example, on the rear side of the actuating section, which rear side faces away from the vehicle interior compartment. Sections of the carrier section can also form a visible surface which faces the vehicle interior compartment and is directly visible from the latter, however.

A front side of the actuating section is preferably defined by the surfaces of the actuating section facing towards the vehicle interior compartment, when installed in the vehicle and being in a rest position. The border between front side and rear side of the actuating section is preferably given by the surfaces that face parallel to the surface of the vehicle surface directly surrounding the actuating section when installed in the vehicle and being in a rest position.

Preferably, a surface faces in the direction of its normal (pointing outside the material).

Directly visible preferably means that there is no further coating (e.g., paint, chrome) or over-molding of the decorative section. The plastic of the decorative section is preferably the outmost surface layer of the actuating section in the area of the portions of the decorative section which are directly visible.

The specification of "first" material/plastic and "second" material/plastic is not determining the order of manufacturing. The invention encompasses producing at first the carrier section (first plastic) and then the decorative section (second plastic), but also producing first the decorative section and then the carrier section.

The decoration section is connected to the carrier section in an integrally joined manner which preferably means that they are held together by atomic or molecular forces and are non-detachable, can only being able to be separated by destruction. However, the meaning also covers a form fit connection of the decoration section to the carrier section, which form fit was produced by the molding process inside an injection molding tool. Hence, a bonding by atomic or molecular forces is not necessarily needed, but preferred.

The carrier section and the decoration section, preferably visible section can be adapted in a targeted manner to the respective requirements by, according to the invention, a different material being used for the decoration section, preferably decoration section, preferably visible section which is particularly critical with regard to the visual requirements than for the carrier section. At the same time, a single-piece component is formed by way of the integrally joined connection, with the result that no additional fastening means are required. This not only improves the visual appearance, but also facilitates the production and assembly.

As described, there are not inconsiderable requirements of the actuating section, but also of the housing, for example a housing recess which receives the actuating section, with regard to the resilience, in particular the maximum breaking load. According to the invention, said requirements can be met without problems by a correspondingly resilient material being selected for the carrier section. At the same time, a visually particularly high quality surface can be realized by way of the selection of a suitable, different material for the decoration section, preferably visible section, without the material which is used to this end and is frequently not sufficiently resilient impairing the resilience of the housing and/or the actuating section overall. Thus, for example, a material with a metallic look is possible for the decoration section, preferably visible section. Chrome plating which, as has been described, is problematic for environmental protection and health reasons can be dispensed with. The decoration section, preferably visible section can have a considerably smaller thickness than the carrier section. For example, the greatest thickness of the decoration section, preferably visible section can be less than 50% of the smallest thickness of the carrier section, preferably less than 20% of the smallest thickness of the carrier section. As a result, the rigidity of the housing and/or the actuating section, provided by way of the carrier section, can be maximized with, at the same time, a low tendency for surface defects of the decoration section, preferably visible section. If, in particular, only one surface which faces the vehicle interior compartment, for example, is formed by way of the decoration section, preferably visible section, this forms a geometry which can be produced simply and without surface defects.

According to the invention, in addition or as an alternative to the actuating section, the housing of the interior door handle arrangement can also have a carrier section made from a first plastic and a decoration section, preferably visible section made from another, second material which is connected to the carrier section in an integrally joined manner. A decoration section, preferably visible section might be formed by way of a section which is made from a different material than the housing and, for example, is molded onto a carrier section of the housing. A housing recess which receives the actuating section is to be mentioned in this respect by way of example. In this case, a recess front side which faces the vehicle interior compartment might be formed by way of the decoration section, preferably visible section, and a section which lies behind it and is particularly relevant with regard to overload requirements might be formed by way of the carrier section. Furthermore, trim strips with a metallic look or loudspeaker bezels are to be mentioned by way of example. If both the actuating section and the housing have a carrier section and a decoration section, preferably visible section in the way according to the invention, the carrier sections can be formed in each case from the same material or from different materials. The decoration section, preferably visible sections can also be formed in each case from the same material or from different materials.

In accordance with one particularly practical refinement, the housing and/or the actuating system can have been produced using a two-component injection molding method. This allows particularly simple and inexpensive production. As a result, surface defects can be minimized in a particularly efficient manner by way of the combination of the construction according to the invention comprising the carrier section and the decoration section, preferably visible section and the production using a two-component injection molding method. It has been shown that shrinkage occurs to a particular extent during hardening in the case of the housing sections and/or actuating sections which were described at the outset and are molded completely from a plastic which is highly suitable for the surface for visual reasons, which shrinkage leads to surface defects, such as flow lines or recesses. Shrinkage and the associated surface defects are minimized by the decoration section, preferably visible section being molded onto the carrier section which is formed from a different material in accordance with the abovementioned refinement. The carrier section thus forms a stable basis for the molding of the decoration section, preferably visible section, as a result of which shrinkage can be reduced substantially. Flow lines and recesses can be avoided reliably. At the same time, the abovementioned refinement allows the production of different decoration section, preferably visible sections by way of only one injection molding die, for example made from plastics of different colors, in a manner which is dependent on the respective application. The flexibility is increased further as a result.

The decoration section, preferably visible section can also consist of a plastic.

In accordance with a further refinement, the carrier section and/or a third section made of a third plastic forms a surface with sections of it that cannot be directly seen from the vehicle interior compartment, preferably when the actuating section is in a rest position, wherein the carrier section and/or the third section is arranged on a rear side of the actuating section, which rear side is or is intended to be facing away from the vehicle interior compartment.

In accordance with a further refinement the actuating section and/or the third section is configured to be gripped by a vehicle occupant, in order to open and/or to close a vehicle door from the inside, whereby the carrier section and/or the third section on the rear side of the actuating section is to be gripped behind and/or touchable by the vehicle occupant.

In accordance with a further refinement, the carrier section comprises bearing means preferably one or more, preferably coaxial openings, for pivotally mounting the actuating section to the housing, at a rear side of the actuating section, wherein in the unmounted but otherwise finished state of the actuating section, the first plastic is directly visible at a surface of the actuating section at least at the bearing means.

In accordance with a further refinement, one of the carrier section and the decoration section has been produced in a first injection molding shot using a first mold half and a second mold half resulting in a first blank, and wherein the respective other of the carrier section and the decoration section has been produced in a second injection molding shot onto the first blank, preferably onto an outer surface of the first blank, after a change of the first mold half and/or the second mold half resulting in a second blank, while the first blank remained in one of the first mold half and the second mold half until the second blank was shot onto it.

Hereby, a well-defined border between first and second plastics and a high-quality surface can be achieved because each section carrier and decoration is shot in a therefor optimized shape and the first blank is exactly positioned where it is expected to be positioned for the second injection molding shot.

In accordance with a further refinement the change of the first mold half and/or the second mold half comprised an exchange of one of the first mold half and the second mold half by a third mold half, preferably by rotating a rotatable tool side, while the first blank remained in the non-exchanged tool half, wherein the second blank is formed by at least the third mold half.

Hereby, a high quality second cavity can be provided.

In accordance with a further refinement, the second plastic forms at least one convex edge, preferably upper, when installed in the vehicle below the head position of a seated driver of the vehicle, edge, or at least one convex arcuate portion, preferably upper, when installed in the vehicle below the head position of a seated derived of the vehicle, of a surface of the actuating section such that the second plastic extends towards a rear side of the actuating section.

Hereby, the appearance of the actuation as seen from the vehicle compartment can be further enhanced.

In accordance with a further refinement, a portion of the surface of the rear side of the actuating section is formed by the second plastic extending from a front side of the actuating section towards the rear side of the actuating section forming said at least one edge or arcuate portion.

Hereby, the appearance of the actuation as seen from the vehicle compartment can be further enhanced as the decorative section is even building a surface on the rear side of the handle.

In accordance with a further refinement another portion of the surface of the rear side of the actuating section is formed by the first plastic.

In accordance with a further refinement, the second plastic at the location where it forms said at least one edge or arcuate portion has an increased thickness compared to a thickness of the second plastic at the front side of the actuating section and/or a varying thickness.

Hereby, it is possible to create an edge or an arcuate portion by the second material without creating an undercut. This is therefore easier to produce.

In accordance with a further refinement, the portion of the second plastic extending from the front side of the actuating section towards the rear side of the actuating section forming said at least one edge or arcuate portion has at least a width, preferably parallel to a borderline between front side and rear side of the actuating section of 5 mm, preferably at least 10 mm.

Hereby, the quality of the surface appearance, especially when high gloss and/or metallic look surface is desired, can be further enhanced, because the second plastic can flow in a broad front into the area that will become a surface on the front side of the actuation section.

In accordance with a further refinement, the portion of the second plastic extending from a front side of the actuating section towards the rear side of the actuating section forming said at least one edge or arcuate portion extends over at least 25%, preferably at least 40%, particularly preferably at least 70%, most preferably 99% of the border between front side and rear side of the actuating section, preferably along at least a top portion of the actuating section.

Hereby, the appearance of the actuation section as seen from the vehicle compartment can be further enhanced because the decorative section extends to the rear side to a great extent. For example, the fact that the actuation section is made of two materials might not be perceived by an occupant passenger of the vehicle, if the upper portion of the actuation section, when installed conventionally in the vehicle door, is formed by the first component that is extending to the rear side.

In accordance with a further refinement, at the location where the second plastic extends from the front side of the actuating section towards the rear side of the actuating section forming said at least one edge or arcuate portion, the actuating section has or had, for example because removed by subsequent grinding, a first tool split line, preferably parallel but spaced apart, preferably towards the rear side, from the border between front side and rear side, at the border between the first plastic and the second and/or third plastic, and a second tool split line, preferably approximately parallel, particularly preferred collinear, to a portion of the border between front side and rear side, extending within the first plastic.

In accordance with a further refinement, the decoration section has over at least 70%, preferably at least 80%, of its front side surface, a constant thickness, which means in case of doubt with a variation of less than 30%, preferably less than 20% of the average thickness.

Hereby, the visual appearance of the decoration section is further enhanced because the flow of the second plastic material is enhanced. Preferably, within the portions of the decoration section having a constant thickness, the carrier section has a variable thickness, which means in case of doubt with variations of more than 30%, preferably more than 50% of the average thickness. The thickness is preferably measured from the front side towards the rear side, along a surface normal.

In accordance with a further refinement, the decoration section has over at least 70%, preferably at least 80%, of its front side surface, a thickness within the range of 0.5 mm and 3.5 mm, preferably within the range of 0.7 mm and 1.5 mm.

Hereby, the visual appearance of the decoration section is further enhanced because the flow of the second plastic material is enhanced. The inventors have found that the thickness shall neither be smaller to avoid obstruction nor bigger to avoid zebra-patterns than the given interval, preferably even the preferred interval to minimize the risk of these unwanted effects.

In accordance with a further refinement, the decoration section has over at least 70%, preferably at least 90%, of its front side surface a surface roughness Ra smaller or equal to 2 µm, preferably smaller or equal to 1.1 µm, or further preferred a specular reflection gloss of at least 60 gloss units measured at 60°, preferably at least 70 gloss units measured at 60°.

Hereby, the visual appearance of the decoration section is further enhanced. The inventors have found out that the invention is particularly suited for high gloss surfaces, which are very sensitive to flow turbulences and material shrinkage.

In accordance with a further refinement, the decoration section constitutes at least 90%, preferably at least 99%, of the front side of the actuating section.

Furthermore, the carrier section can consist of a reinforced plastic, in particular a glass fiber reinforced plastic. As a result, particularly satisfactory carrier properties can be achieved. A very wide variety of material combinations are fundamentally conceivable for the carrier section and the decoration section, preferably visible section. Some possible material combinations will be specified in the following text merely by way of example: carrier section: PA6 reinforced, decoration section, preferably visible section: PA6 decoration; carrier section: PA6 with cool-touch effect, decoration section, preferably visible section: PA6 decoration; carrier section: SAN reinforced, decoration section, preferably visible section: PC-ABS or ABS; carrier section: POM reinforced, decoration section, preferably visible section: POM decoration.

In accordance with a further refinement, the carrier section and the decoration section, preferably visible section, can consist of the same basic plastic material, and preferably the plastic of the carrier section being reinforced, in particular being glass fiber reinforced. As a result, in particular, a two-component injection molding process can be simplified further. Furthermore, the first plastic and the second plastic can be identical, preferably both reinforced by a filler material, e.g. glass fiber. In that case, it is preferred that the surface of the decoration section is grained. There exist other techniques for making a grained surfaced actuation section, these often require gas assisted injection molding or specific designs of the carrier section in order to avoid massive portions of plastic material which lead to shrinking that would even be visible on a grained surface. However, this new technique of a two (or more) layer approach makes it less necessary or even unnecessary to use gas assisted injection molding or specific designs of the carrier section because the decoration section is per see thin enough to avoid shrinking and is molded in a separate shot.

The decoration section, preferably visible section, can have a different color than the carrier section. As a result, particularly great design freedom is achieved. The decoration section, preferably visible section and the carrier section might also fundamentally have the same color, however.

In accordance with a further refinement, the decoration section, preferably visible section, can consist of a plastic with a metallic look. Plastics of this type with a metallic look which can be produced, in particular, using plastic injection molding methods (Mold In Metal Color) are known per se. They have a similar surface quality to chrome plating, but without having the environmental and health problems of chrome plating. As described, moreover, plastics of this type with a metallic look frequently do not have the required resilience. This problem is solved by way of the construction according to the invention of the housing and/or actuating system.

In accordance with a further refinement, the carrier section can consist at least in sections of a plastic with a cool-touch effect. A mineral filling or metal particles, in particular ferromagnetic metal particles, can be embedded into the plastic of the carrier section. The coolness which is usually associated with metal surfaces is achieved by way of the embedding of a mineral filling or metal particles into the plastic, although a plastic material is used which can correspondingly also be processed using a plastic injection molding process. For example, the carrier section can form the rear side of the actuating section, which rear side faces away from the vehicle interior compartment and is to be gripped by a vehicle occupant in order to actuate the vehicle door. By said rear side being formed from a plastic with a cool-touch effect, in combination with a metal-look plastic, the impression of a metal handle results optically and haptically for a vehicle occupant for the decoration section, preferably visible section which forms the front side of the actuating section, which front side faces the vehicle interior compartment. In order to increase the cool-touch effect, the carrier section can consist of a plastic with a satisfactory thermal conductivity. Preferably, within the scope of this invention a plastic exhibits the cool-touch effect if the value measured by the therefore designed instrument "HapTemp" of company "ZIEGLER-Instruments GmbH is equal or below to 19, preferably equal or below to 15. This instrument is capable to measure an equivalent of the perceived haptic temperature, with steel having a value of 0, glass a value of 10, PTFE a value of 20. These values are based on an "HapTemp" instrument built in 2012 (serial no. 12.11.1), software version 16.2.8, last calibrated in January 2019.

In accordance with a further refinement, a cavity can be configured in the carrier section. Plastics with a cool-touch effect or plastics with a mineral filling or metal particles embedded therein have a high density. In order to counteract this, a cavity can be configured in the carrier section. This can be achieved, for example, in the case of a plastic injection molding process by way of the injection of gas into the still flowable plastic, in order to displace corresponding material. The configuration of a cavity of this type would also be conceivable, for example, in the case of a plastic, such as PA6-GF30.

In accordance with a further refinement, the decoration section, preferably visible section can consist of a plastic which is at least partially transparent for visible light. In accordance with a further refinement in this regard, diffuser particles for diffusing visible light can be embedded into the plastic which is at least partially transparent for visible light. As a result of the use of a plastic which is partially transparent or completely transparent for visible light, the decoration section, preferably visible section can be illuminated by way of a suitable light source, such as LEDs, for example within the context of ambient illumination of a vehicle. If, in particular, a plastic with diffuser particles which are embedded therein is used, diffusion of the light occurs and, as a result, a uniform emission of light from the housing and/or the actuating section with surmounting of the total reflection and, as a consequence, a uniform illumination effect. Plastics of this type are available, for example, under the name "Plexiglas LED" from the manufacturer Evonik Industries. Using plastics of this type, a diffuse light emission can be achieved on the surface of the decoration section, preferably visible section in the case of a lateral light transmission.

In accordance with a further refinement, the decoration section, preferably visible section can have been attached to the carrier section in an in-mold painting method. In this context, the in-mold painting method is treated as an injection molding method. The production method corresponds fundamentally to the two-component injection molding method, that cavity of the injection molding die which configures the decoration section, preferably visible section being of very small thickness. For example, said cavity can have a thickness of less than 1 mm, preferably less than 0.3 mm. The component (color) which forms the decoration section, preferably visible section is pressed into the cavity for the decoration section, preferably visible section after the injection molding of the carrier section and, after hardening, forms a surface which is similar to a paint coat. The design freedom with regard to the color of the decoration section, preferably visible section can be increased further in this way with a high surface quality.

In accordance with a further refinement, a third section can be connected to the carrier section in an integrally joined manner. The third section can be applied, for example, on a rear side of the carrier section, which rear side faces away from the vehicle interior compartment in the mounted state, with the result that the third section forms said rear side, for example, of the actuating section. As described, the decoration section, preferably visible section can be arranged on the front side of the carrier section, which front side faces the vehicle interior compartment, and can therefore form the front side of the actuating section. Production of the third section is likewise possible using a plastic injection molding method, for example a three-component injection molding method. The third section can thus consist of a different material than the carrier section and/or the decoration section, preferably decoration section, preferably visible section. For example, the carrier section can consist of a reinforced plastic, in particular a glass fiber reinforced plastic, and the third section can consist of a plastic with a cool-touch effect and/or with an embedded mineral filling or metal particles and/or the third section can consist of a plastic which is softer than the first and/or the second plastic, thereby providing a soft-touch effect. As a result, difficulties which are associated with plastics of this type, such as high density and brittleness, can be limited to the third section which is thin in comparison with a carrier section, with the result that the density and resilience of the housing and/or actuating section overall is not impaired on account of the carrier section which is optimized in this regard. In the following text, material combinations which are conceivable for this purpose are once again specified merely by way of example: carrier section: PA6 reinforced, decoration section, preferably visible section: PA6 decoration, third section: PA6 cool-touch; carrier section: PA6 reinforced or PC reinforced or SAN reinforced, decoration section, preferably visible section: material which is (partially) transparent for visible light/with light diffusing particles, third section: PA6 cool-touch.

The invention also achieves the object mentioned at the outset by way of a method for producing an interior door handle arrangement according to the invention, the interior door handle arrangement being produced in a multiple-component injection molding method, for example a two-component injection molding method or a three-component injection molding method. As described at the outset, particularly high quality surfaces with at the same time a high resilience can be produced in a simple way in terms of production technology as a result.

In accordance with one refinement of the invention, in the case of the use of plastics for the carrier section or the third section with ferromagnetic particles which are embedded therein, it can be provided that a magnet is applied to a surface of the carrier section in the still flowable state of the plastic, with the result that the ferromagnetic metal particles approach the surface. The surface can be, in particular, a surface which is provided for gripping by way of a vehicle occupant. In this way, the distribution of the ferromagnetic metal particles in the plastic can be influenced in such a way that they are concentrated in the region of the surface which is provided for touching by way of a vehicle occupant. As a result, the cool-touch effect can be maximized, without it being necessary for the material overall to be permeated by a high number of ferromagnetic metal particles. It is also possible by way of said refinement, by way of the use of a magnet with a corresponding geometry, to move or re-orient, for example, ferromagnetic particles to the surface only in accordance with the geometry of the magnet. Here, the magnet can be applied to a surface of the carrier section, which surface is subsequently to be covered by way of the decoration section, preferably visible section. If, for example, a subsequent application of the decoration section, preferably visible section then takes place using an In Mold Painting method, the geometry on the surface can be made visible. In this way, for example, a logo or another graphic can be represented visually.

In accordance with a further refinement, the injection molding process comprises producing an actuating section by at least the steps:
  a) producing one of
     a carrier section of a first plastic, and
     a decoration section of a second plastic
  in a first injection molding shot using a first mold half and a second mold half defining a first cavity resulting in a first blank,
  b) producing the respective other of the carrier section and the decoration section in a second injection molding shot onto the first blank, preferably onto an outer surface of the first blank, after a change of the first mold half and/or the second mold half in order to define a second cavity resulting in a second blank, while the first blank remains in one of the first mold half and the second mold half until the second blank was shot onto it, wherein preferably, the first blank is held in the respective cavity by a slider, preferably a slider masking holes for a pivot of the actuating section, or by an undercut geometry of the respective cavity, whereby then the part is preferably ejected from the mold by enforced demolding.

Hereby, it is possible to create surfaces and separation lines between the two or more plastics such that the visual quality of the decoration section is enhanced. Preferably, the method comprises a further change of the tool and, in a third injection molding shot producing a third section by shooting a third plastic onto the first and/or second blank, resulting in a third blank. The third plastic is preferably a material which is softer than the first and/or second plastic and/or which exhibits the cool-touch effect. Here, "masking" has preferably the meaning of blocking a specific volume, while "unmasking" has the meaning of unblocking a blocked volume.

In accordance with a further refinement, the change of the first mold half and/or the second mold half comprises an exchange of one of the first mold half and the second mold half by a third mold half, preferably by rotating a rotatable tool side, while the first blank remains in the non-exchanged tool half, wherein the second blank is formed by at least the third mold half.

In accordance with a further refinement, the decoration section is or is intended to be at least partially directly visible from the vehicle interior compartment and facing the vehicle interior compartment, wherein the actuating section has a front side intended to face the vehicle interior compartment and a rear side intended to face away from the vehicle interior compartment, wherein preferably the carrier section is produced in the first injection molding shot and the decoration section is produced in the second injection molding shot, wherein in the one of the first cavity and second cavity, which is intended to form the decoration section, the second plastic is injected a) at a location which is to become a portion of the rear side of the actuating section, such that the second plastic flows along at least one concave mold edge, preferably upper, when installed in the vehicle below the head position of a seated driver of the vehicle, edge, or at least one concave arcuate mold portion towards the front side of the actuating section or b) at a location which is hidden by a housing, e.g. by a wall of the housing between the vehicle compartment and that location, in which the actuating section is intended to be movably arranged.

In accordance with a further refinement, the second plastic flows around the at least one mold edge or the at least one arcuate mold portion over at least a width of 5 mm, preferably at least 10 mm.

Hereby, the surface quality is enhanced as the flow of the second plastic is better equalized. Furthermore, it is possible to hide the material of the carrier section for additional view angles or when the actuation section is actuated.

In accordance with a further refinement, the carrier section is produced in the first injection molding shot and the decoration section is produced in the second injection molding shot.

wherein in the one of the first mold half and the second mold half, in which the first blank remains until the second blank was shot onto it, a first volume defining a mold portion for a surface of the rear side of the actuating section, preferably at the edge of the cavity, is masked in the first injection molding shot by a slider of that mold half, preferably moving across the tool opening direction, or by a protruding portion of the respective other mold half, and wherein the first volume is unmasked after the first injection molding shot, and preferably before the second injection molding shot, by retracting the slider or exiting the protruding portion of the respective other mold half, such that for the second injection molding shot there is a passageway, preferably along an outer surface of the first blank, from a surface of the rear side towards the front side allowing the second plastic to flow along the at least one mold edge or the at least one arcuate mold portion towards the front side of the actuating section.

Hereby, although the second plastic is injected on the rear side, it is possible to guide the plastic to the front side.

In accordance with a further refinement, a surface of the first or second cavity, which is forming a front side of the decoration section, is over at least 70%, preferably at least 90%, of its surface polished such that the value of the surface roughness Ra is smaller than or equal to 2 μm, preferably smaller than or equal to 1.1 μm.

Hereby, a high gloss surface is achievable directly out of the mold and by using the special two component design according to the invention, no further surface treatment is necessary for achieving a high-quality appearance.

BRIEF DESCRIPTION OF THE DRAWINGS

One exemplary embodiment of the invention will be described in greater detail in the following text using figures, in which, diagrammatically:

FIG. 3 shows a sectional view along the line A-A in FIG. 2, FIGS. 4A-4G and 5 show based on the foregoing figures an actuating section according to another embodiment of the invention, whereas FIGS. 4A-4F show, in a section at B-B as depicted in FIG. 5, the process of manufacturing the actuating section, FIG. 4G shows a respective section of the finished actuating section and FIG. 5 shows a perspective view on the top and rear side of said actuating section.

Unless indicated otherwise, identical designations denote identical objects in the figures.

DETAILED DESCRIPTION

Figure 1:
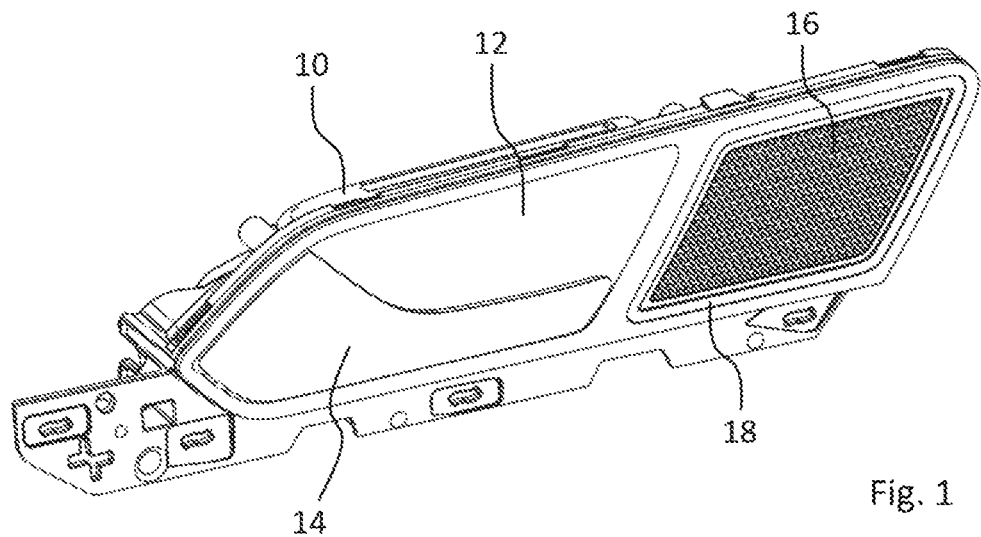
FIG. 1 shows an interior door handle arrangement according to the invention in a perspective view.

The interior door handle arrangement which is shown in FIG. 1 comprises a housing 10, by way of which it can be fastened to a door of a vehicle, such as a passenger car or truck. The housing 10 has a handle recess 12, in which an actuating section 14 (a handle section 14 in the present example) is received in the rest position which is shown in FIG. 1. The handle section 14 can be pivoted from said rest position out of the handle recess 12 with its right-hand (in FIG. 1) free end about a pivot axis which is, for example, vertical in the mounted state. The vehicle door is unlocked by way of pivoting out of the handle section 14 via a corresponding connection, with the result that said vehicle door can subsequently be opened by a vehicle occupant. In order to pivot out the handle section 14, the vehicle occupant reaches into the handle recess 12 and grips behind the handle section 14. In the example which is shown, the handle section 14 forms a handle lever 14. Moreover, a loudspeaker 16 which is surrounded by a bezel 18 is integrated into the housing 10.

Figure 2:
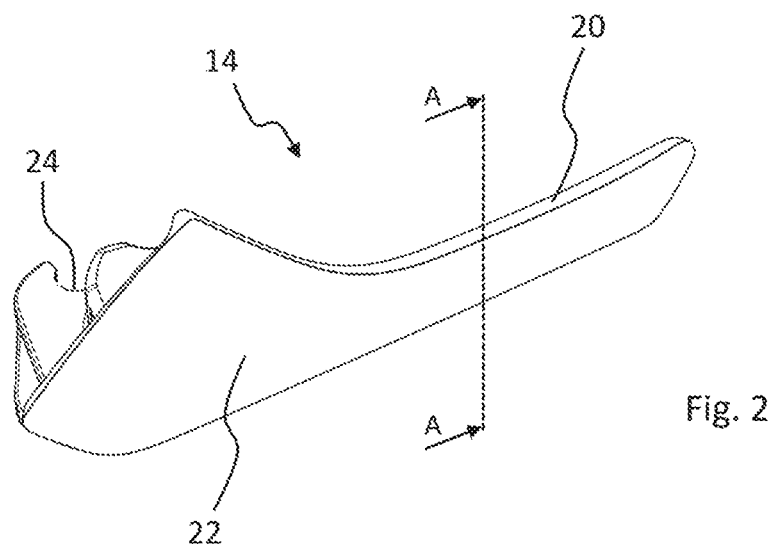
FIG. 2 shows the handle section of the interior door handle arrangement which is shown in FIG. 1, in an enlarged perspective illustration.
Figure 3:
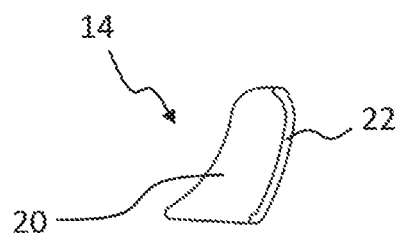

It can be seen in the enlarged illustration of FIG. 2 that the handle section 14 has a carrier section 20 which faces away from the vehicle interior compartment in the rest position and a decoration section, preferably visible section 22 which faces the vehicle interior compartment. The carrier section 20 forms the rear side of the handle section 14, which rear side is to be gripped behind by a vehicle occupant, and the visible section 22 forms the front side of the handle section 14, which front side is directly visible from the vehicle interior compartment. At its left-hand (in FIG. 2) end, the carrier section 20 has bearing means 24, by way of which the handle section 14 can be mounted pivotably on the housing 10. It can be seen in the sectional view of FIG. 3 that the visible section 22 has a considerably smaller thickness than the carrier section 20.

The visible section 22 is connected to the carrier section 20 in an integrally joined manner. In the example which is shown, the visible section 22 has been molded onto the carrier section 20 using a two-component injection molding method. The carrier section 20 consists of a plastic, for example a reinforced plastic, such as a glass fiber reinforced plastic. It can have an embedded mineral filling or embedded metal particles, for example ferromagnetic metal particles, with the result that a vehicle occupant perceives a cool surface and therefore the impression of a metal when reaching behind the carrier section 20 in order to pivot the handle section 14 out of the handle recess 12 of the housing 10. Accordingly, the visible section 22 can consist of a plastic with a metallic look (Mold In Metal Color). The visible section 22 might also consist of different plastics, however, for example plastics of different color or the like. The visible section 22 might also have been connected to the carrier section 20 in an integrally joined manner using an In Mold Painting method.

In the example which is shown, the bezel 18 of the loudspeaker 16 has also been molded onto the housing 10 using a two-component injection molding method. The bezel 18 can consist, for example, of the material which is used for the visible section 22.

The decoration section 22 is intended to be at least partially directly visible from the vehicle interior compartment and facing the vehicle interior compartment, wherein the handle section 14 has a front side intended to face the vehicle interior compartment and a rear side intended to face away from the vehicle interior compartment.

In the following, FIGS. 4A-4G and FIG. 5 are described in more detail. The carrier section 20 forms a surface with sections of it that cannot be directly seen from the vehicle interior compartment, wherein the carrier section 20 is arranged on the rear side of the handle section 14, which rear side is or is intended to be facing away from the vehicle interior compartment. The handle section 14 is configured to be gripped by a vehicle occupant, in order to open and/or to close a vehicle door from the inside, whereby the carrier section 20 on the rear side of the handle section 14 is to be gripped behind and touchable by the vehicle occupant. The carrier section 20 comprises bearing means 24, here two coaxial openings 24.1, for pivotally mounting the handle section 14 to the housing 10, at a rear side of the handle section 14, wherein in the unmounted but otherwise finished state of the handle section 14, the first plastic is directly visible at a surface of the handle section 14 at least at the bearing means 24. The carrier section 20 has been produced in a first injection molding shot using a first mold half 31 and a second mold half 32 resulting in a first blank 41, wherein the decoration section 22 has been produced in a second injection molding shot onto the first blank 41, here onto an outer surface of the first blank, after a change of the second mold half 32 resulting in a second blank 42, while the first blank remained in the first mold half 31 until the second blank 42 was shot onto it. The change of the second mold half 32 comprised an exchange of the second mold half 32 by a third mold half 33, here by rotating a rotatable tool side, while the first blank 41 remained in the non-exchanged tool half 31, wherein the second blank 42 is formed by at least the third mold half 33. A portion of the surface of the rear side of the handle section 14 is formed by the second plastic extending from a front side of the handle section 14 towards the rear side of the handle section 14 forming said arcuate portion 28. Another portion of the surface of the rear side of the handle section 14 is formed by the first plastic. The second plastic at the location where it forms said arcuate portion 28 has an increased thickness compared to a thickness of the second plastic at the front side of the handle section 14 and a varying thickness. The portion of the second plastic extending from the front side of the handle section 14 towards the rear side of the handle section 14 forming said arcuate portion 28 has at least a width 23, preferably parallel to a borderline 26 between front side and rear side of the handle section, of at least 10 mm, here even a couple of centimeters. The portion of the second plastic extending from a front side of the handle section 14 towards the rear side of the handle section 14 forming said arcuate portion 28 extends over at least 40% of the border 26 between front side and rear side of the handle section 14 along at a top portion 27 of the handle section. At the location where the second plastic extends from the front side of the handle section 14 towards the rear side of the handle section 14 forming said arcuate portion 28, the handle section 14 has a first tool split line 29 at the border between the first plastic and the second and/or third plastic, parallel but spaced apart towards the rear side from the border 26 between front side and rear side extending within the first plastic, and a second tool split line 30 extending within the first plastic, collinear to a portion of the border 26 between front side and rear side at the border between the first plastic and the second plastic. The decoration section 22 has over on its complete front side surface and in addition over the portions on the rear side a specular reflection gloss of at least 70 gloss units measured at 60°, illustrated by reflection lines 25.

The handle section 14 is produced by a multiple-component injection molding process by the steps:

a) producing the carrier section 20 of the first plastic in a first injection molding shot using a first mold half 31 and a second mold half 32 defining a first cavity 34 resulting in a first blank 41 (FIGS. 4A-4C), b) producing the decoration section 22 in a second injection molding shot onto the first blank 41 onto an outer surface of the first blank after a change of the second mold half 32 in order to define a second cavity 35 resulting in a second blank 42 (FIGS. 4D-4F), while the first blank 41 remains in the first mold half 31 until the second blank 42 was shot onto it. The first blank is held in the respective cavity 34, 35 by a slider masking the holes 26.1 for a pivot of the handle section 14.

The change of the second mold half 32 comprises an exchange the second mold half 32 by a third mold half 33 by rotating a rotatable tool side, while the first blank 40 remains in the non-exchanged tool half 31, wherein the second blank 42 is formed by the third mold half 33 and the first tool half 31. In the second cavity 35, which is intended to form the decoration section 22, the second plastic is injected at a location which is to become a portion of the rear side of the handle section 14. Here, it is injected from the first mold half 31, in the area of the first volume 31.1 and then flowing into the portion of the second cavity 35 defined by the third mold half 33. The second plastic flows along at least one more than 135° angled concave arcuate mold portion 36 towards the front side of the handle section 14 over at least a width 23 of 10 mm. The first mold half 31 has a first volume 31.1 defining a mold portion for a surface of the rear side of the handle section 14, at the rim 31.2 of the cavity defined by that tool half 31 which is masked in the first injection molding shot by a protruding portion 32.1 of the second mold half 32. The first volume 31.1 is unmasked after the first injection molding shot and preferably before the second injection molding shot by retracting the protruding portion 32.1, such that for the second injection molding shot there is a passageway 32.2 along an outer surface of the first blank 41 from a surface of the rear side towards the front side allowing the second plastic to flow along the arcuate mold portion 36 towards the front side of the handle section 14. The tool surface of the second cavity 35 for decoration section 22 is polished such that the value of the averaged surface roughness Ra is smaller than 2 μm.

With this invention, especially an inner door handle/method for manufacturing such door handle (actuating section) has been presented. It has at least two plastic layers, carrier section and decoration section, joined by injection molding: the first layer building a rear surface and the second layer building visual front surface. It is preferred that the first layer is molded by a first tool cavity, whereby the second layer is molded onto the first layer by using a modified tool cavity, while the first layer remains in a portion of the first cavity. Further preferred, the modified cavity is preferably "highly" polished to generate a high gloss surface directly out of the injection molding tool.

Statements 1 to 26 below enumerate some aspects and features of the invention:

1. An interior door handle arrangement of a vehicle, comprising a housing (10) and an actuating section (14) which is movably arranged on the housing (10), wherein the actuating section (14) has a carrier section (20) made from a first plastic and a decoration section (22) made from a second plastic which is connected to the carrier section (20) in an integrally joined manner, wherein the actuating section (14) has been produced using a two-component injection molding process.

2. The interior door handle arrangement per statement 1, wherein the carrier section (20) comprises bearing means (24) at a rear side of the actuating section (14), wherein in the unmounted but otherwise finished state of the actuating section (14), the first plastic is directly visible at a surface of the actuating section (14) at least at the bearing means (24).

3. The interior door handle arrangement either statement 1 or 2, wherein one of the carrier section (20) and the decoration section (22) has been produced in a first injection molding shot using a first mold half (31) and a second mold half (32) resulting in a first blank (41), —and wherein the respective other of the carrier section (20) and the decoration section (22) has been produced in a second injection molding shot onto the first blank (41) after a change of the first mold half (31) and/or the second mold half (32) resulting in a second blank (42), while the first blank remained in one of the first mold half (31) and the second mold half (32) until the second blank (42) was shot onto it.

4. The interior door handle arrangement per any one of statements 1-3, wherein the second plastic forms at least one convex edge or at least one convex arcuate portion (28) of a surface of the actuating section (14) such that the second plastic extends towards a rear side of the actuating section (14).

5. The interior door handle arrangement per statement 4, wherein a portion of the surface of the rear side of the actuating section (14) is formed by the second plastic extending from a front side of the actuating section (14) towards the rear side of the actuating section (14) forming said at least one edge or arcuate portion (28).

6. The interior door handle arrangement per one of statements 4 to 5, wherein the portion of the second plastic extending from the front side of the actuating section (14) towards the rear side of the actuating section (14) forming said at least one edge or arcuate portion (28) has at least a width (23) of 5 mm.

7. The interior door handle arrangement per statement 6, wherein the portion of the second plastic extending from a front side of the actuating section (14) towards the rear side of the actuating section (14) forming said at least one edge or arcuate portion (28) extends over at least 25% of the border (26) between front side and rear side of the actuating section (14).

8. The interior door handle arrangement per one of statements 4 to 7, wherein at the location where the second plastic extends from the front side of the actuating section (14) towards the rear side of the actuating section (14) forming said at least one edge or arcuate portion (28), the actuating section (14) has or had, —a first tool split line (29) at the border (26) between the first plastic and the second and/or third plastic, and—a second tool split line (30) extending within the first plastic.

9. The interior door handle arrangement per any one of statements 1-8, wherein the decoration section (22) has over at least 70% of its front side surface a constant thickness.

10. The interior door handle arrangement per any one of statements 1-9, wherein the decoration section (22) has over at least 70% of its front side surface a thickness within the range of 0.5 mm and 3.5 mm 11. The interior door handle arrangement per any one of statements 1-10, wherein the decoration section (22) has over at least 70% of its front side surface a surface roughness Ra smaller or equal to 2 μm.

12. The interior door handle arrangement per any one of statements 1-11, wherein the decoration section (22), preferably visible section (22), consists of a plastic with a metallic look.

13. The interior door handle arrangement per any one of statements 1-12, wherein the carrier section (20) consists at least in sections of a plastic with a cool-touch effect.

14. The interior door handle arrangement per any one of statements 1-13, wherein a mineral filling or metal particles, in particular ferromagnetic metal particles, is/are embedded into the plastic of the carrier section (20).

15. The interior door handle arrangement per any one of statements 1-14, wherein the decoration section (22), preferably visible section (22), consists of a plastic which is at least partially transparent for visible light.

16. The interior door handle arrangement per statement 15, wherein diffuser particles for diffusing visible light are embedded into the plastic which is at least partially transparent for visible light.

17. The interior door handle arrangement per any one of statements 1-16, wherein a third section is connected to the carrier section (20) in an integrally joined manner.

18. The interior door handle arrangement per statement 17, wherein the third section consists of plastic with a cool-touch effect.

19. A method for producing an interior door handle arrangement, preferably per any one of statements 1-18, wherein the interior door handle arrangement is produced in a multiple-component injection molding process.

20. The method per statement 19 for producing an interior door handle arrangement per at least statement 14, wherein a magnet is applied to a surface of the carrier section (20) in the still flowable state of the plastic, with the result that the ferromagnetic metal particles approach the surface.

21. The method per one of statements 19 to 20, wherein the injection molding process comprises producing an actuating section (14) by at least the steps: producing one of a carrier section (20) of a first plastic, and a decoration section (22) of a second plastic, in a first injection molding shot using a first mold half (31) and a second mold half (32) defining a first cavity (34) resulting in a first blank (41); producing the respective other of the carrier section (20) and the decoration section (22) in a second injection molding shot onto the first blank (41) after a change of the first mold half (31) and/or the second mold half (32) in order to define a second cavity (35) resulting in a second blank (42), while the first blank (41) remains in one of the first mold (31) half and the second mold half (32) until the second blank (42) was shot onto it.

22. The method per statement 21, wherein the change of the first mold half (31) and/or the second mold half (32) comprises an exchange of one of the first mold half (31) and the second mold half (32) by a third mold half (33), while the first blank (40) remains in the non-exchanged tool half (31), wherein the second blank (42) is formed by at least the third mold half (33).

23. The method per one of statements 21 to 22, wherein the decoration section (22) is or is intended to be at least partially directly visible from the vehicle interior compartment and facing the vehicle interior compartment, wherein the actuating section (14) has a front side intended to face the vehicle interior compartment and a rear side intended to face away from the vehicle interior compartment, wherein in the one of the first cavity (34) and second cavity (35), which is intended to form the decoration section (22), the second plastic is injected: a) at a location which is to become a portion of the rear side of the actuating section (14), such that the second plastic flows along at least one concave mold edge or at least one concave arcuate mold portion (36) towards the front side of the actuating section (14) orb) at a location which is hidden by a housing (10) in which the actuating section (14) is intended to be movably arranged.

24. The method per statement 23, wherein the second plastic flows around the at least one mold edge or the at least one arcuate mold portion (36) over at least a width (23) of 5 mm.

25. The method per one of statements 23 to 24, wherein the carrier section (20) is produced in the first injection molding shot and the decoration section (22) is produced in the second injection molding shot, —wherein in the one of the first mold half (31) and the second mold half (32), in which the first blank (41) remains until the second blank (41) was shot onto it, a first volume (31.1) defining a mold portion for a surface of the rear side of the actuating section (14) is masked in the first injection molding shot by a slider of that mold half (31) or by a protruding portion (32.1) of the respective other mold half, and—wherein the first volume (31.1) is unmasked after the first injection molding shot by retracting the slider or exiting the protruding portion (32.1) of the respective other mold half, such that for the second injection molding shot there is a passageway (32.2) from a surface of the rear side towards the front side allowing the second plastic to flow along the at least one mold edge or the at least one arcuate mold portion (36) towards the front side of the actuating section (14).

26. The method per one of statements 21 to 25, wherein a surface of the first or second cavity (34, 35), which is forming a front side of the decoration section (22), is over at least 70% of its surface polished such that the value of the surface roughness Ra is smaller than or equal to 2 μm.

LIST OF DESIGNATIONS 10 housing
12 handle recess
14 actuating section/handle section
16 loudspeaker
18 bezel
20 carrier section
22 decoration section, preferably visible section
23 width
24 Bearing means
24.1 hole for pivot pin
25 reflection lines
26 border between front side and rear side
27 top portion
28 convex arcuate portion
29 first tool split line
30 second tool split line
31 first mold half
31.1 first volume
31.2 rim of the cavity of first tool half
32 second mold half
32.1 protruding portion
32.2 passageway
33 third mold half
34 first cavity
35 second cavity
36 concave arcuate mold portion
41 first blank
42 second blank

What is claimed is:

1. An interior door handle arrangement of a vehicle, comprising: a housing and an actuating section which is movably arranged on the housing, wherein the actuating section has a carrier section made from a first plastic and a decoration section made from a second plastic which is connected to the carrier section in an integrally joined manner, wherein the actuating section is configured with the decoration section and the carrier section molded together as a monolithic unit;
wherein the actuating section includes a rear side configured for facing toward a door in an installed state and a front side that is viewable from an interior of the vehicle in the installed state, wherein the decoration section forms the front side, and at least portions of the rear side are formed by the carrier section;
wherein the second plastic forms at least one convex edge or at least one convex arcuate portion of an external surface of the actuating section so that the second plastic extends around an in continuous bonded contact with a corner portion of the carrier section to the rear side of the actuating section such that a borderline region between the first plastic and the second plastic at the convex edge or convex arcuate portion is visible from the rear side of the actuating section, wherein the corner portion is formed by intersecting regions of a front facing surface portion of the carrier section and a side facing surface portion of the carrier section.

2. The interior door handle arrangement as claimed in claim 1, wherein the carrier section comprises bearing means at the rear side of the actuating section, wherein in the unmounted but otherwise finished state of the actuating section, the first plastic is directly visible at a surface of the actuating section at least at the bearing means.

3. The interior door handle arrangement as claimed in claim 1, wherein a portion of the surface of the rear side of the actuating section is formed by the second plastic extending from the front side of the actuating section towards the rear side of the actuating section forming said at least one convex edge or convex arcuate portion.

4. The interior door handle arrangement as claimed in claim 3, wherein the portion of the second plastic extending from the front side of the actuating section towards the rear side of the actuating section forming said at least one convex edge or convex arcuate portion has at least a width of 5 mm.

5. The interior door handle arrangement as claimed in claim 4, wherein the portion of the second plastic extending from the front side of the actuating section towards the rear side of the actuating section forming said at least one convex edge or convex arcuate portion extends over at least 25% of a border between the front side and the rear side of the actuating section.

6. The interior door handle arrangement as claimed in claim 5, wherein at the location where the second plastic extends from the front side of the actuating section towards the rear side of the actuating section forming said at least one convex edge or convex arcuate portion, the actuating section has a first tool split line at the border where the first plastic and the second plastic are bonded together, and a second tool split line extending within the first plastic.

7. The interior door handle arrangement as claimed in claim 1, wherein the decoration section has over at least 70% of its front side surface a constant thickness.

8. The interior door handle arrangement as claimed in claim 1, wherein the decoration section has over at least 70% of its front side surface a thickness within the range of 0.5 mm and 3.5 mm.

9. The interior door handle arrangement as claimed in claim 1, wherein the decoration section has over at least 70% of its front side surface a surface roughness Ra smaller or equal to 2 µm.

10. The interior door handle arrangement as claimed in claim 1, wherein ferromagnetic metal particles is/are embedded into the first plastic.

11. The interior door handle arrangement as claimed in claim 1, wherein the second plastic is at least partially transparent for visible light.

12. The interior door handle arrangement as claimed in claim 11, wherein diffuser particles for diffusing visible light are embedded into the second plastic.

13. The interior door handle arrangement as claimed in claim 1, wherein a thickness of the second plastic along the front facing surface portion of the carrier section is greater than a thickness of the second plastic along the side facing surface portion of the carrier section.

\* \* \* \* \*